(12) United States Patent
Margiott et al.

(10) Patent No.: US 6,936,360 B2
(45) Date of Patent: Aug. 30, 2005

(54) METHOD AND APPARATUS FOR OPERATING A FUEL CELL SYSTEM

(75) Inventors: Paul R. Margiott, South Windsor, CT (US); Zakiul Kabir, Glastonbury, CT (US); Vincent M. Callaghan, West Granby, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 0 days.

(21) Appl. No.: 10/266,065

(22) Filed: Oct. 7, 2002

(65) Prior Publication Data

US 2003/0031899 A1 Feb. 13, 2003

Related U.S. Application Data

(62) Division of application No. 09/525,728, filed on May 26, 2000, now Pat. No. 6,519,510, which is a division of application No. 09/123,709, filed on Jul. 28, 1998, now Pat. No. 6,093,500.

(51) Int. Cl.[7] .............................................. H01M 8/00
(52) U.S. Cl. .......................................... 429/13; 429/24
(58) Field of Search .............................. 429/13, 22, 23, 429/24, 30, 46, 26; 307/11, 29, 38, 65, 66; 320/124; 363/74

(56) References Cited

U.S. PATENT DOCUMENTS

| | | | |
|---|---|---|---|
| 4,769,297 A | 9/1988 | Reiser et al. | |
| 4,859,545 A | 8/1989 | Scheffler et al. | |
| 5,045,414 A | 9/1991 | Bushnell et al. | |
| 5,064,732 A | 11/1991 | Meyer | |
| 5,503,944 A | 4/1996 | Meyer et al. | |
| 5,700,595 A | 12/1997 | Reiser | |
| 6,083,636 A | * 7/2000 | Hsu | 429/13 |

* cited by examiner

*Primary Examiner*—Raymond Alejandro
(74) *Attorney, Agent, or Firm*—McCormick, Paulding & Huber LLP

(57) ABSTRACT

Method and apparatus for changing the state of operation of a fuel cell, such as starting the fuel cell up or shutting the fuel cell down, are disclosed. An idle load is applied to the fuel cell when the cell temperature is between about normal operating temperature and a transition temperature, and fuel and oxidizer are supplied to the fuel cell commensurate with the power delivered to the idle load. Below the transition temperature, purging/passivation procedures known in the art can be followed, and an open or dummy load applied to the fuel cell. At normal operating temperature or above a service load is applied to the fuel cell.

16 Claims, 3 Drawing Sheets

METHOD AND APPARATUS FOR OPERATING A FUEL CELL SYSTEM

CROSS REFERENCE TO RELATED APPLICATION

This is a divisional application of application Ser. No. 09/525,728, filed May 26,2000, now U.S. Pat. No. 6,519,510 issued on Feb. 11, 2003, which is a divisional application of U.S. patent application No. 09/123,709, now U.S. Pat. No. 6,093,500 filed on Jul. 28, 1998, both of which are hereby incorporated by reference in their entirety.

FIELD OF THE INVENTION

This invention relates to fuel cells and more particularly to methods and apparatus for more efficiently and effectively changing the state of operation of a fuel cell, such as shutting a fuel cell down.

BACKGROUND OF THE INVENTION

Many types of fuel cells are known in the art, such as solid oxide fuel cells, molten carbonate fuel cells, phosphoric add fuel cells and proton exchange membrane (PEM) fuel cells. Conceptually, the operation of a fuel cell is very simple. An electrolyte separates an anode and a cathode, between which electricity is produced when a fuel is introduced to the anode, an oxidizer is introduced to the cathode, and the cell is maintained within a proper temperature range. The electrolyte allows an ionic species to travel between the cathode and the anode. The reaction products are relatively simple and benign, typically including water and carbon dioxide, thus minimizing environmental concerns, and the operating efficiencies are theoretically relatively high. In contrast to other energy sources, such as internal combustion engines, fuel cells are simpler, less noisy, do not pollute, and create electricity directly. Accordingly, fuel cells are considered by many to hold considerable promise as the power source of the future.

In reality, however, fuel cell systems can be relatively complex, as considerable hardware can be required to support the fuel cells. Such hardware can include thermal management subsystems, fuel processing subsystems, and water management sub-systems. Furthermore, in practice, particular detailed procedures for changing the state of operation of the fuel cell, such as shutting the cell down, or starting the cell up, are often required to avoid damage to the fuel cell.

For example, it can be necessary or desirable to shut down the fuel cell for any number of reasons. An emergency shutdown can be required because a monitored parameter is out of an acceptable range; a shut down can be scheduled for maintenance of the cell or of the associated subsystems, or servicing of the load may necessitate a "hot hold". Each of these state changes typically involves immediately removing the electrical load from the fuel cell.

Such state changes can damage the fuel cell if electrode potentials, which typically rise upon removal of the load, are not properly controlled when the cell is at an elevated temperature. For example, as disclosed in U.S. Pat. No. 5,045,414, issued to Bushnell et al. and herein incorporated by reference, in a phosphoric acid fuel cell the cathode can undergo catalyst dissolution, catalyst support corrosion and catalyst layer flooding, if the potential exceeds eight tenths (0.8) of a volt. On the other hand, if the cathode potential approaches the anode potential and the cathode is subsequently re-oxidized, the catalyst can recrystallize and lose activity. If the anode reaches the potential of the cathode, it can flood with electrolyte. Accordingly, the control of electrode potentials is an important concern.

The '414 patent discloses a variation of a technique, known in the art, of purging and passivating the fuel cell upon removal of the service load. According to the '414 patent, nitrogen is added to the cathode flow field to create a nitrogen/oxygen mix having less than 1% oxygen by volume, and nitrogen is supplied to the anode. The concentration of oxygen supplied to the cathode is important, as low a concentration can prevent achieving the proper potential and too high a concentration can cause catalyst dissolution, corrosion of the catalyst support, and catalyst layer flooding. The proper concentration of oxygen can depend on several factors, including the matrix thickness and composition of the electrolyte, as well as the temperature of the fuel cell. A dummy load is often switched to the cell to bring the cathode potential down rapidly at the start of the purges.

However, such approaches are not entirely satisfactory. The possibility of damage to electrodes remains due to the relatively sudden and large change in electrical loading on the cell. Furthermore, reconnecting the service load after a "hot hold" requires purging the system of the inert gases and reintroducing the reactants at the appropriate rates and concentrations to achieve damage-free normal power operation.

As a simpler and more effective technique for changing the state of operation of a fuel cell would be a welcome advance, it is an object of the invention to improve upon the aforementioned methods and apparatus of the prior art, and to address one or more of the disadvantages and drawbacks thereof.

It is another object of the invention to provide improved methods and apparatus for changing the state of operation of a fuel cell.

Other objects of the invention will in part be apparent and in part appear hereinafter.

DETAILED DESCRIPTION OF THE PREFERRED EMBODIMENTS

Figure 1:
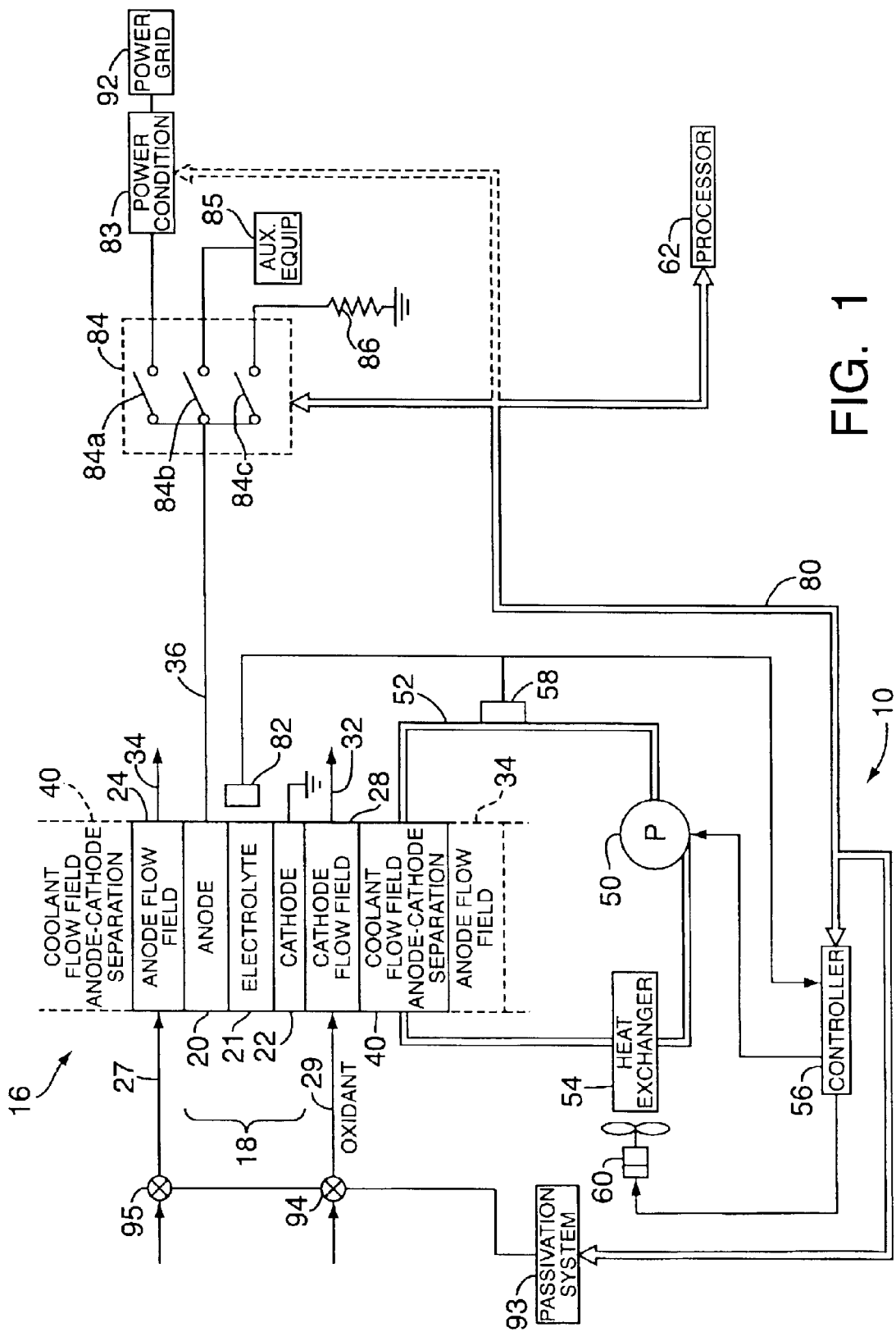
FIG. 1 schematically illustrates one embodiment of an apparatus according to the present invention.

FIG. 1 schematically illustrates a fuel cell system 10 according to the invention. The fuel cell system 10 includes a fuel cell assembly 16 that includes at least one fuel cell 18.

The fuel cell 18 includes an electrolyte 21, such as a proton exchange membrane (PEM) or phosphoric acid held in a silicon carbide matrix, that is interposed between an anode 20 and a cathode 22. As is understood by one of ordinary skill in the art, the fuel cell 18 can include other layers omitted for simplicity from FIG. 1, such as a substrate layers adjacent the cathode and anode. As is also understood, the fuel cell assembly 16 is adapted for defining an anode flow field 24 for receiving fuel from the anode flow field input 27 and directing the fuel so as to selectively expose the anode 20 to the fuel. Similarly, the fuel cell assembly 16 is adapted for defining a cathode flow field 28 for receiving oxidizer (e.g. oxygen) from the cathode flow field input 29 and directing the oxidizer so as to selectively expose the cathode 22 to the oxidizer. The anode and cathode flow fields are indicated schematically, for, as understood by one of ordinary skill in the art, the fuel cell assembly 16 can be adapted in a number of ways to define the flow fields. Typically, plates having channels or grooves in a side direct a flux of fuel and oxidizer reactants appropriately. The cathode and anode flow fields can include exhausts 32 and 34 respectively.

In operation of the fuel cell assembly 16, the fuel received by the anode input 27 is reduced at the anode 20, liberating electrons and protons (H+). When, for example, the fuel cell 18 is a PEM cell, the H+ protons travel through the electrolyte 21 to the cathode 22, where they unite with electrons and the oxidizer (e.g. oxygen) to form water that enters the cathode flow field 28. The anode 20 and cathode 22 develop a potential there between, and power is delivered to the external circuit 36. The electrons are received at the cathode from the external circuit 36.

The fuel cell 18 is described herein as representative; typically, the fuel cell assembly 16 contains a plurality of fuel cells, such as fuel cell 18, stacked atop one another, as partially indicated by the depiction of another anode flow field 39 below the cathode flow field 28. The electrical outputs of the various anodes and cathodes of the plurality of fuel cells are combined.

Block 40 schematically indicates an important function performed in a cell assembly 16 that includes a plurality of fuel cells. Adjacent cathode and anode flow fields, such as cathode flow field 28 and anode flow field 39, are separated to prevent commingling of oxidizer and fuel reactants. Structurally, the fuel cell assembly 16 can be adapted in a variety of ways to accomplish separation of the cathode 28 from the anode 39 indicated by block 40.

The anode-cathode separation indicated by block 40 can be accomplished by structure that also defines a coolant flow field, as disclosed in U.S. Pat. No. 5,503,944, issued to Meyer et al. on Apr. 2, 1996, and herein incorporated by reference. Disclosed in the '944 patent are porous plates that define the cathode and anode flow fields, 28 and 29, respectively, and that also define a coolant flow field between the plates and hence between the anode and cathode flow fields.

In the embodiment shown in FIG. 1, a pump 50 forces a coolant, typically water, through cooling loop 52 that can include a heat exchange element 54 for exchanging heat with the cooling loop 52. A controller 56 can be included for controlling a fan 60 associated with the heat exchanger 54 and for controlling the pump 50 in response to signals from a coolant temperature sensor 58 and/or a fuel cell temperature monitor 82. The temperature of the fuel cell can be maintained at a selected set point temperature by controlling the fan 60 and the pump 50. As understood by one of ordinary skill in the art, in light of the disclosure herein, the pump 50, cooling loop 52, heat exchanger 54 and fan 60 are but one possible system for thermal control, and variations and substitutions in such a thermal control system are known in the art and considered within the scope of the invention.

According to the invention, the load applied to the fuel cell 18 is selectively controlled, as is described in more detail below in conjunction with FIG. 2. The load can be controlled by various means. For example, the switching element 84 can include individual switches 84a, 84b and 84c for electrically connecting to the fuel cell the power grid 92, auxiliary equipment 85 associated with the fuel cell power supply system, typically referred to as parasitics, and including pumps, fans, compressors, etc., and a dummy load 86 which can also be a parasitic or a resistor. The individual switches are controlled, such as by the processor 62, or manually, to apply a selected load, such as a service, idle, dummy or open load, to the fuel cell assembly 16.

A power conditioner 83 typically conditions power delivered to the power grid 92 to convert the direct current (d.c.) output of the fuel cell 18 to alternating current (a.c.) for compatibility with the power grid 92. The power conditioner 83 can be an switching inverter that switches the d.c. output of the fuel cell 18 to an inductive energy storage element from which power is delivered to the power grid 92. Varying the duty cycle of the switched d.c. applied to the inductive energy storage element can vary the power delivered to the power grid 92 and hence the load applied to the fuel cell 18. Accordingly, selective control of the power conditioner 83 can provide a technique for applying a selected load to the fuel cell.

The fuel cell system 10 can include a processor 62 for executing a program and that communicates with external devices over the data bus 80. The processor 62 can communicate with and control the controller 56, and individual switches 84a, 84b and 84c, and/or power conditioner 83.

The passivation system 93 injects a gas mixture, via valves 94 and 95, to the cathode and anode flow fields, 28 and 24, respectively, for purging the flow fields of reactants and for passivating the electrode to prevent damage thereto, as is known in the art, and described in the '414 patent referenced above. As shown in FIG. 1, the processor 62 can also control the purge/passivation system 93.

Figure 2A:
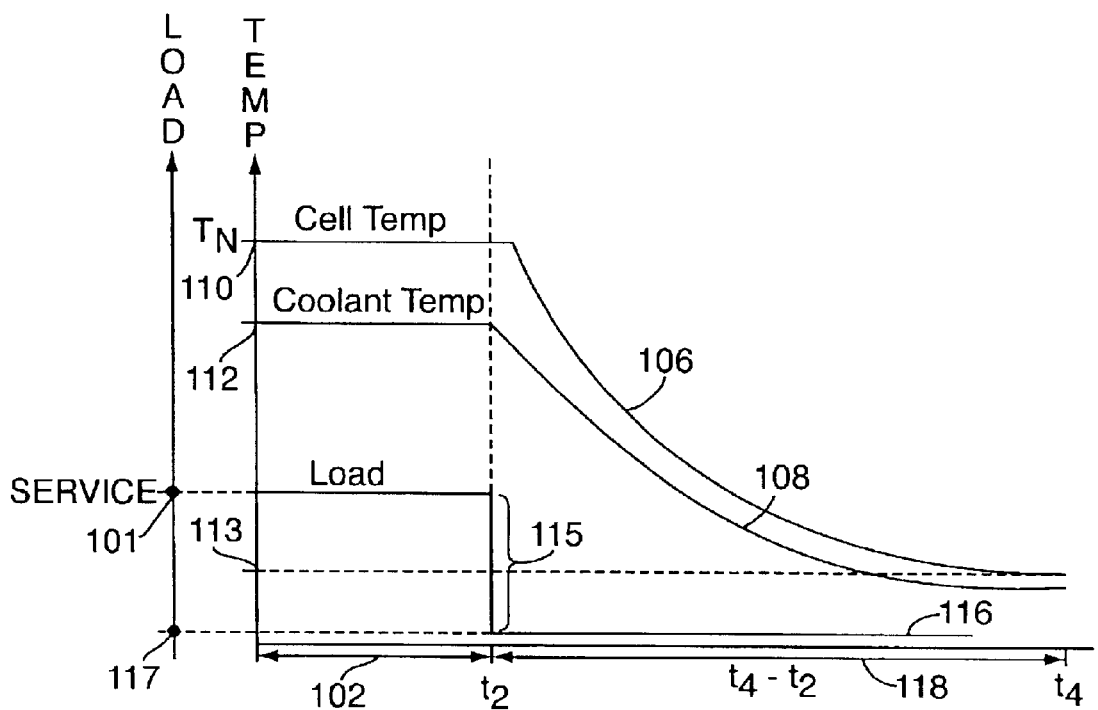
FIG. 2A graphically illustrates one technique known in the prior art for changing the state of operation of a fuel cell system.
Figure 2B:
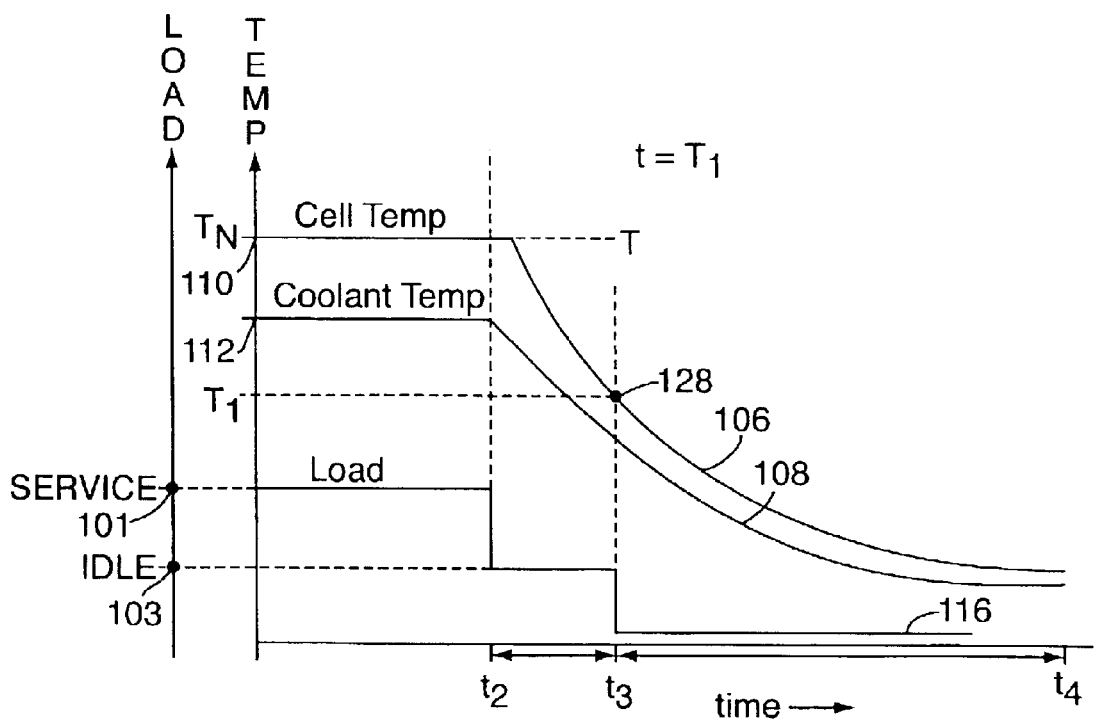
FIG. 2B graphically illustrates one example of changing the state of operation of the fuel cell system of FIG. 1 according to the invention.

FIGS. 2A and 2B graphically illustrate the operation of the fuel cell system according to the invention.

In FIG. 2A, the technique commonly followed according to the prior art for transitioning the fuel cell 18 from state of normal operation to a second state at a reduced temperature is illustrated. Shown are curves 106, 108 and 116 representing the average temperature of the cell 18, the average temperature of the coolant in the cooling system after exiting the coolant flow field, and the load applied to the fuel cell, respectively. Note that there is a differential between the coolant temperature 108 and the temperature of the fuel cell 106. For the time period indicated by reference numeral 102, the fuel cell operates normally at the normal operating temperature indicated by reference numeral 110. At time $t_2$ a decision is made to shut down the fuel cell, that is to change state of operation of the power supply from providing power to the service load and operating at a normal operating temperature to applying a dummy load 117 or an open load (i.e. no load) to the fuel cell 18 and to reduce the temperature to a second state temperature 113. For a phosphoric acid fuel cell, the second state temperature can be a shutdown temperature of approximately 130 degrees Fahrenheit, which is sufficient to prevent solidification of the electrolyte 21.

According to the prior art, upon a decision to shut down the fuel cell 18, a dummy load 117 or an open load is immediately applied to the fuel cell, typically involving immediately disconnecting the fuel cell from the power grid 92. The cooling system is controlled, either manually or by a processor, such as the processor 62 in FIG. 1, to cool down the fuel cell 18 at a selected rate. However, cooling the fuel cell 18 can take up to several hours, and the fuel cell 18 thus sees a sudden change in electrical loading, as indicated by reference numeral 115, while the fuel cell 18 is at or near normal operating temperature, and remains under minimal loading for a significant period of time while at elevated temperature. Typically, the passivation/purging procedures akin to those disclosed in the '414 patent discussed are also initiated at time $t_2$ to avoid or limit losses and damage to the fuel cell 18.

According to the invention the sudden and large change in the loading 115 while the fuel cell 18 is at an elevated temperature is avoided. As shown in FIG. 2B between approximately the normal operating temperature 110 and approximately a transition temperature indicated by reference numeral 128, an idle load 103 that is less than the normal load 101 and greater than an open load 117 is applied to the fuel cell 18. As the idle load 103 is less than the normal load, cooling down of the fuel cell 18 is facilitated. Input reactant flows of oxygen and fuel are maintained at a level commensurate with the power delivered to the idle load 103. Preferably, the idle load 103 is less than the maximum load for which the fuel cell 18 is rated and is greater an a typical dummy load (a few percent or less of the maximum rated load); more preferably, the idle load is between approximately 5% of the maximum rated load and 60% of the maximum rated load, and most preferably, the idle load is between approximately 10% of the maximum load and approximately 40% of the maximum load.

With reference again to FIG. 1, the service load 101 can be applied to the fuel cell by closing switch 84a for supplying power to the grid 92 and, optionally switch 84b can also be closed for supplying power to the auxiliary equipment 122, such as pumps and blowers that are typically associated with the fuel cell 18. Switch 84c may also be closed if desired and/or necessary. Alternatively, switch 84a can be closed and switches 84b and 84c open, if, for example, operation of the fuel cell system does not require that the switches 84b and 84c be closed. An idle load can be applied by opening switch 84a and closing switch 84b and in addition, switch 84c. A dummy load can be applied by leaving switches 84a and 84b open and dosing 84c. The switches 84a, 84b and 84c are illustrated as representative, and each can include multiple switches for supplying power to multiple entities.

Alternatively, the power conditioner 83 can be controlled, independently or in combination with control of the switches 84, to selectively apply a load to the fuel cell 18. The above examples are exemplary; as discussed above, the term load refers to the power drawn from the fuel cell 18, rather than to the specific physical entity that consumes the power.

Purging/passivation procedures may be deferred until the fuel cell 18 is cooled to approximately the transition temperature 128. As understood by one of ordinary skill in the art, in light of the disclosure herein, practice of the invention does not preclude introducing passivating gases to the anode and cathode flow fields 24 and 28 while the idle load 103 is applied to the fuel cell system.

For a phosphoric acid fuel cell, the fuel cell normal operating temperature 110 is typically about 390 degrees Fahrenheit, the coolant temperature 112 is typically about 350 degrees Fahrenheit, and the transition temperature indicated by reference number 128 can typically range from about 290 to 310 degrees Fahrenheit. The time 118, i.e., $t_4$–$t_2$, in FIG. 2A, can be 2 hours, and the second state temperature 113 can be approximately 130 degrees Fahrenheit.

For a PEM cell, the normal operating temperature 110 is typically about 180 degrees Fahrenheit, the coolant temperature 112 is typically about 170 degrees Fahrenheit and the transition temperature 128 can range from about 125 to 145 degrees Fahrenheit. The second state temperature 133 can be about 70 degrees Fahrenheit, or ambient temperature if the ambient temperature is above 32 degrees Fahrenheit.

Figure 3:
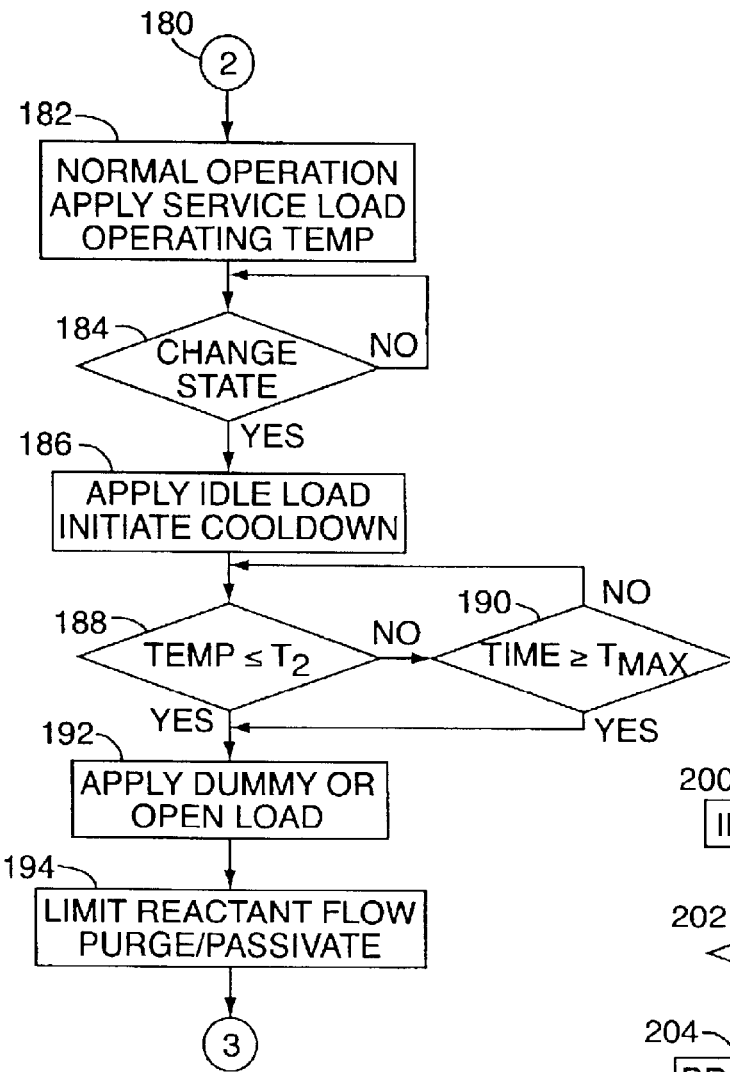
FIG. 3 is a flow chart illustrating the steps followed in changing the state of operation of the fuel cell system of FIG. 1 in accordance with the graphical illustration of FIG. 2B.

FIG. 3 is a flow chart illustrating the steps followed in shutting down the fuel cell system of FIG. 1 in accordance with the graphical representation of FIG. 2B. The steps illustrated in FIG. 3 can be directed by a program executed by the processor 62 in FIG. 1, or can be manually performed. Reference number 180 indicates a starting point for further reference below. As indicated by box 182, the fuel cell 18 is in a normal state of operation, within a normal range of operating temperature, and a normal, or service, load is applied to the fuel cell. As shown in box 186, upon following the "yes" branch from decision box 184, the idle load is applied to the fuel cell 18. The fuel cell assembly 16 is cooled down, such as by the processor 62 changing the set point of the controller 56, and the controller accordingly controlling the fan 60 or pump 50, or a valve (not shown) to reduce the temperature and/or increase the flow rate of the coolant circulating in the coolant loop 52. The processor also tracks the elapsed time since the application of the idle load to the fuel cell, and, upon expiration of a selected period of time, such as 15 minutes, proceeds to box 192 whether or not the fuel cell 18 has cooled to the transition temperature.

The processor monitors the temperature of the fuel cell 18 via the sensor 82 or of the coolant loop 52 via sensor 58, and when the one of these temperatures indicates that the fuel cell temperature is reduced to the transition temperature 128, applies the dummy load 117, or alternatively, an open load (no physical load electrically connected to the computer). As indicated by box 194, passivation/purge procedures can now be followed, which typically limit or cease the flow of input reactants.

One advantage of the invention is that terminating the cool down and returning to normal operation, that is, going back to box 182 from box 186, can be simpler, because the input reactants have not necessarily been displaced by passivation gases or carefully controlled to very low concentrations.

Figure 4:
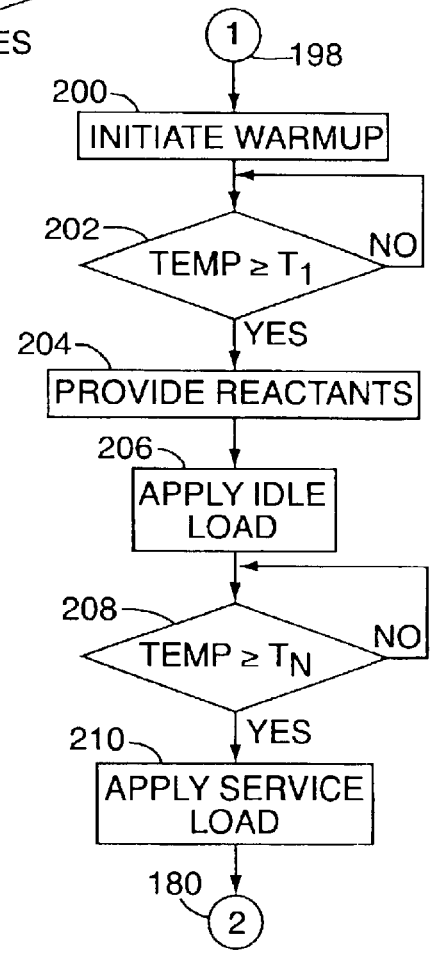
FIG. 4 is a flow chart of steps followed in starting up the fuel cell system of FIG. 1.

The present invention can also be practiced in accordance with starting up a fuel cell 18, as illustrated in FIG. 4. As shown in block 200 of FIG. 4, the fuel cell system is warmed, such as by circulating a heated "cooling fluid" through the coolant flow field 40. With reference to decision block 202 and block 404, upon reaching the transition temperature $T_1$, input reactants (i.e. oxidizer and fuel) can be supplied to the fuel cell system commensurate with power consumed by the idle load, which, as indicated by block 206, is applied to the fuel cell. As shown in decision box 208, upon reaching approximately a suitable normal operating temperature, $T_n$, the service load 92 is applied to the fuel cell 18, as indicated by block 210. Such a process may be followed by the procedure illustrated in FIG. 3, and the relationship between FIGS. 3 and 4 is indicated by reference number 180 present in both FIGURES. For simplicity a passivation procedure, which may be used in starting up the fuel cell system 18, is omitted from FIG. 4.

It is thus seen that the invention efficiently attains the objects set forth above, among those made apparent from the preceding description. Because certain changes may be made in the above constructions without departing from the scope of the invention, it is intended that all matter presented in the above description or shown in the accompanying drawings be interpreted as illustrative and not as limiting.

It is also understood that the following claims are to cover a generic and specific features of the invention described herein and all statements of the invention, which, as a matter of language, might be said to fall there between.

Having described the invention, what is claimed as new and desired to be secured by Letters Patent is:

1. A method of operating a fuel cell system having at least one fuel cell to transition the fuel cell between a normal state of operation at a normal operating temperature and under a service load and a second state at a second temperature less than the operating temperature and under a second load less than the service load, comprising:

(a) removing the service load from the fuel cell;

(b) applying to the fuel cell an idle load that is less than the service load and greater than the second load;

(c) reducing the temperature of the fuel cell to a transition temperature;

(d) removing the idle load from the fuel cell and applying the second load to the fuel cell only after the temperature of the fuel cell has fallen to the transition temperature;

(e) initiating a purging procedure on the fuel cell; and (f) reducing the temperature of the fuel cell to the second temperature.

2. The method of claim 1 including the step of selecting the fuel cell to be one of a phosphoric acid fuel cell and a proton exchange membrane (PEM) fuel cell.

3. The method of claim 1 wherein applying an idle load includes applying an idle load that consumes between approximately 5% and approximately 60% of the maximum power that the fuel cell system is rated to produce.

4. The method of claim 1 wherein applying an idle load includes applying to the fuel cell an idle load that consumes between approximately 10% and approximately 40% of the maximum power that the fuel cell system is rated to produce.

5. The method of claim 1 including the step of selecting the fuel cell to be a phosphoric acid fuel cell and wherein reducing the temperature of the fuel cell to the transition temperature includes reducing the temperature of the fuel cell to be between approximately 290 degrees Fahrenheit and approximately 310 degrees Fahrenheit.

6. The method of claim 1 including the step of selecting the fuel cell to be a PEM fuel cell and wherein reducing the temperature of the fuel cell to a transition temperature includes reducing the temperature of the fuel cell to be between approximately 70 degrees Fahrenheit and approximately 120 degrees Fahrenheit.

7. The method of claim 1 including the step of selecting the fuel cell to be a PEM fuel cell and wherein reducing the temperature of the fuel cell to the second state temperature includes reducing the temperature to be approximately equal to the ambient temperature of the environment surrounding the fuel cell system when said ambient temperature is greater than 32 degrees Fahrenheit.

8. The method of claim 1 including the step of selecting the fuel cell to be a phosphoric acid fuel cell and wherein reducing the temperature of the fuel cell to the second state temperature includes reducing the temperature to approximately 130 degrees Fahrenheit.

9. The method of claim 1 wherein reducing the temperature of the fuel cell to the transition temperature includes reducing the temperature of a coolant flowing in a coolant flow field of the fuel cell system.

10. The method of claim 1 wherein reducing the temperature of the fuel cell to the transition temperature includes increasing the flow rate of a coolant through a coolant flow field of the fuel cell system.

11. The method of claim 1 wherein removing the idle load includes removing the idle load after a selected period of time has elapsed since application of the idle load to the fuel cell.

12. The method of claim 1 wherein removing the idle load from includes removing the idle load upon the temperature of the fuel cell being reduced to the transition temperature.

13. The method of claim 1 wherein initiating a purge procedure includes supplying to a cathode flow field of the fuel cell a mixture including nitrogen and oxygen, the oxygen being present in the mixture at less than approximately 1% by volume.

14. The method of claim 1 wherein initiating a purge procedure includes providing nitrogen gas to an anode flow field of the cell fuel.

15. The method of claim 1 wherein initiating a purge procedure includes reducing the flow of oxidizer and fuel reactant to cathode and anode flow fields, respectively, of the fuel cell.

16. The method of claim 1 wherein the step of applying a second load to the fuel cell includes applying a dummy load and wherein initiating the purge procedure includes initiating the purge procedure subsequent to the application of the second load to the fuel cell system.

* * * * *